UNITED STATES PATENT OFFICE.

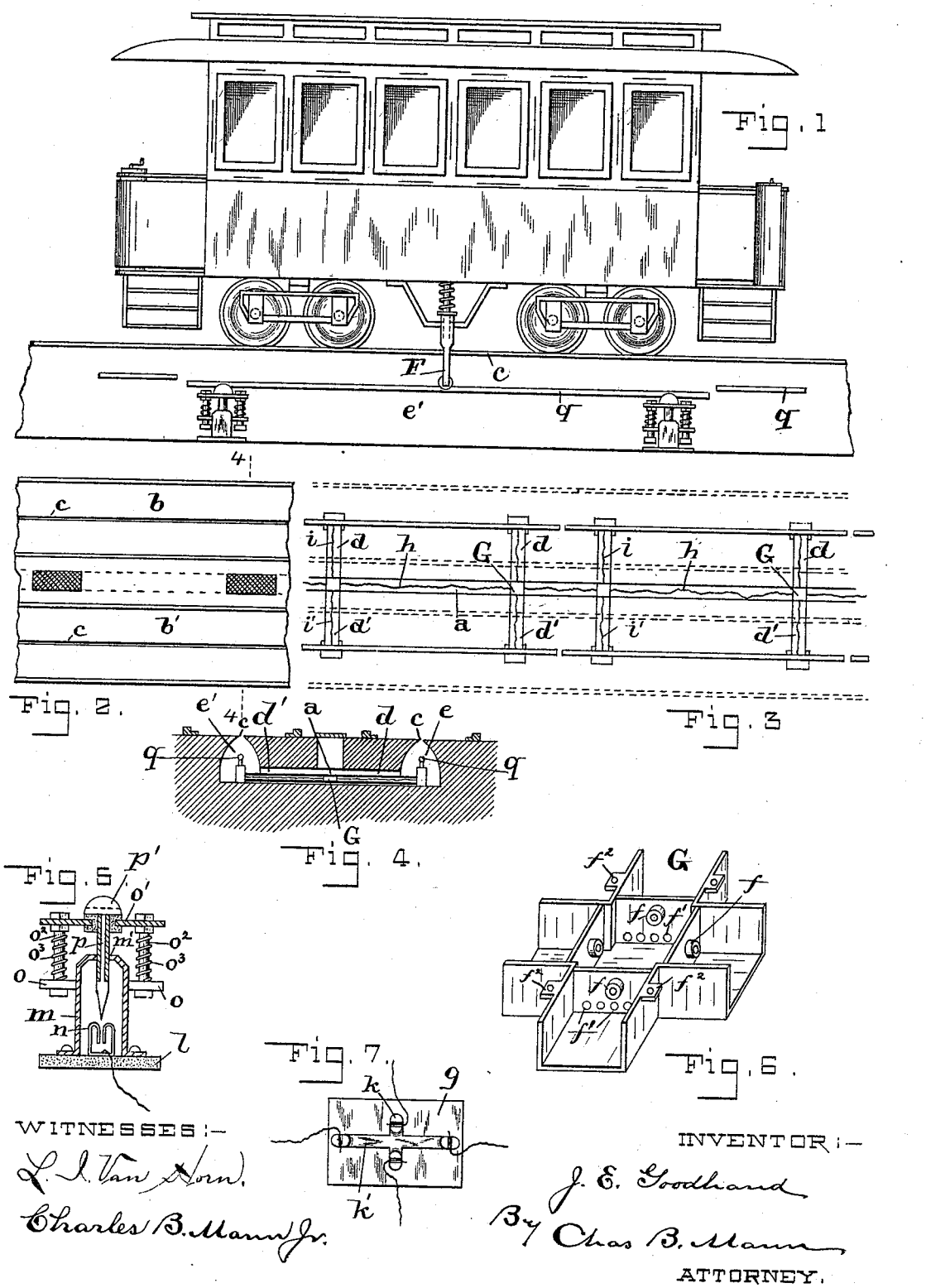

JAMES E. GOODHAND, OF BALTIMORE, MARYLAND.

DISTRIBUTION SYSTEM FOR ELECTRIC RAILWAYS.

SPECIFICATION forming part of Letters Patent No. 518,782, dated April 24, 1894.

Application filed January 20, 1894. Serial No. 497,474. (No model.)

*To all whom it may concern:*

Be it known that I, JAMES E. GOODHAND, a citizen of the United States, residing at Baltimore, in the State of Maryland, have invented certain new and useful Improvements in Underground Circuits for Electric Cars, of which the following is a specification.

My invention relates to electric railways of that class which employ a trolley to make contact with an underground conductor.

The object of my invention is to construct the underground conductor in sections having such arrangement as that each section shall be in electrical connection with the source of electricity at such times only as when the translative device is in electrical connection with the section. This I accomplish by arranging within a suitable underground conduit a sectional conductor, each of said sections having one or more yielding supports in electrical and mechanical union therewith, said supports being provided with means for making connection, when depressed, with the feeders, which are also arranged in a conduit and are completely isolated from all exterior molestation.

Referring to the drawings,—Figure 1 is an elevation of a car provided with a contact making device, a section view of a conduit and a series of sectional conductors and supports therefor arranged in the conduit in proximity to the track rails, the said contact device being in working relation to the conductors. Fig. 2 is a plan view of a trackway, showing the relative arrangement of the rails, the slots, and the openings to the electric conduits. Fig. 3 is a diagrammatical representation of the feeder, the branch and the sectional working conductor, the track rails being indicated in dotted lines. Fig. 4 is a cross-sectional view of the conduit on line 4—4 of Fig. 2. Fig. 5 is a view, partly in section, of a spring-returned device such as I employ for making and breaking connection between the feeder conductors and the working conductors. Fig. 6 is a perspective view of a junction or union box the top being removed, which is employed to contain a connecting or cross-over block. Fig. 7 is a plan view of my improved cross-over block.

Referring to the drawings, the letter, $a$, designates a feeder conduit to contain electric wires located midway of the two tracks, $b$, $b'$, in a double track system. At suitable intervals along this conduit are arranged branch conduits, $d$, $d'$, extending in opposite directions at right angles thereto into the two working conduits, $e$, $e'$, each of which is arranged midway of the rails of the tracks, $b$, and, $b'$, respectively, said conduits, $e$, $e'$, having the usual surface slots, $c$, for entrance of the trolley or contact device.

Located at the points of junction of the feeder and branch conduits are union boxes, G, such as is shown in Fig. 6, which may be formed of any suitable metal made watertight and provided in its walls with insulating plugs, $f$, having perforations for the passage of the wires of the system and one or more insulated openings, $f'$, through which additional feeder wires may pass to connect with the main feeder wire and furnish such extra power desired to compensate for any loss of electrical energy said main feeder wire may sustain; the union box is provided with perforated flanges, $f^2$, for the attachment of a suitable cover. Each union box is to contain a connecting block consisting of the base, $g$, of suitable insulating material and of shape to fit within the said union box. Secured on the block or base, $g$, is a pair of metallic strips, $k$, $k'$, formed integrally and extending at right angles to each other and provided at their extremities with means for the attachment of wires. The main feeder wire, $h$, passes through the insulating plugs, $f$, in one union box, G, to the next union box and so on throughout the line. These main feeder wires are insulated and covered to protect them against moisture and are suitably supported between the union boxes; and the branch wires, $i$, $i'$, are insulated and covered in like manner.

At the end of each branch conduit, $d$, $d'$, is a spring-returned-contact device which supports the working conductor, $q$, which is operated upon by the trolley, F, of the car. This contact device comprises a base, $l$, of insulating material; a water tight case, $m$, resting on the base and having in its top a hole, $m'$, two electrical contact pieces, $n$, also resting on the base and within the case; a bracket, $o$, supported by the case or base, a top, $o'$, provided with two pendent rods, $o^2$, rigidly connected with the top and resting in holes in the bracket, o, and supported by coil springs, o³, wound around them between the top and bracket; and a pin, p, provided with a notched head, p', and rigidly connected with but insulated from the top, o',—said pin passing through the hole, m', in the case and its lower end is to take between and make contact with the contact pieces, n. The electric current from the feeder wires, h, is supplied to the contact pieces, n, through the medium of branch wires, i, i', connected with the strips, k', of the connecting block, g.

The branch conduits, d, d', are alternately close and far apart, as shown in Fig. 3, and a spring-returned contact device such as shown in Fig. 5, is at either end of each branch conduit. The working conductors, q, are arranged in separate and unconnected sections with their ends resting upon the notched heads, p', of the two spring-returned contact devices that are the farthest apart, and their adjacent ends project between the two branch conduits that are close together, and said adjacent ends are in such position that after the trolley of the car has made contact with one section, q, said trolley will immediately engage with the working conductor, q, of the adjoining section.

The operation is as follows: As the car moves along the tracks, the trolley, F, makes contact with and presses upon the working conductor, q, and the spring-returned contact devices upon which it rests; this depressing action forces the pin, p, of each contact device down between the two contact pieces, n, and makes electrical connection therewith; thus the electric current passes through the pin, p, to the working conductor, q, and trolley, F, to the motors of the car, and therefrom through the medium of the wheels and track rails to the ground, and thereby completes the circuit. After the trolley leaves the section the springs, o³, of the contact device will force the pin, p, and working conductor, q, up and break contact with the contact pieces, n, and thus shut off the electric current to said working conductor. As the car passes along the trolley makes contact with the next section, q, where the operation just described is repeated.

It is obvious that while I have described my invention as it is specifically shown in the drawings, certain details of construction may be varied or entirely dispensed with, without departing from my invention as hereinafter claimed.

Having thus described my invention, what I claim as new, and desire to secure by Letters Patent, is—

1. In a conduit electric railway, the combination of the feeder and working conduits; branch conduits arranged transversely to and connecting the feeder and working conduits; feeder wires in the feeder conduit, electrical conductors arranged in sections in the working conduits; a connecting block at the intersection of the branch and feeder conduits; and branch wires connecting the feeder wire with the working conductor.

2. In a conduit electric railway, the combination of the feeder and working conduits; branch conduits arranged transversely to and connecting the feeder and working conduits; feeder wires in the feeder conduit; a connecting block at the intersection of the branch and feeder conduits; a union or junction box inclosing said connecting blocks and provided with insulated plugs; and branch wires passing through the plugs in the union box and connecting the feeder wire and working conductors.

3. In a conduit electric railway, the combination of the feeder and working conduits; branch conduits arranged transversely to and connecting the feeder and working conduits; a spring-returned electrical contact making device at each end of the branch conduits; electrical conductors arranged in sections in the working conduits and resting upon the spring returned contact devices; feeder wires in the feeder conduit; a connecting block at the intersection of the branch and feeder conduits; and branch feeder wires connecting the connecting block and spring-returned contact device.

In testimony whereof I affix my signature in the presence of two witnesses.

JAMES E. GOODHAND.

Witnesses:
CHARLES B. MANN, Jr.,
C. C. HINES.